(12) United States Patent
Louis et al.

(10) Patent No.: US 11,529,868 B2
(45) Date of Patent: Dec. 20, 2022

(54) HAUL TRUCK SPACE FRAME MOUNTING ARRANGEMENT

(71) Applicant: Caterpillar Inc., Peoria, IL (US)

(72) Inventors: Jared E Louis, Monticello, IL (US);
Bruno L Risatti, Lemont, IL (US);
David W. Holthaus, Monticello, IL (US)

(73) Assignee: Caterpillar Inc., Peoria, IL (US)

( * ) Notice: Subject to any disclaimer, the term of this patent is extended or adjusted under 35 U.S.C. 154(b) by 467 days.

(21) Appl. No.: 16/663,898

(22) Filed: Dec. 5, 2019

(65) Prior Publication Data

US 2021/0170863 A1 Jun. 10, 2021

(51) Int. Cl.
| | |
|---|---|
| *B60K 15/067* | (2006.01) |
| *B60K 15/073* | (2006.01) |
| *B62D 21/15* | (2006.01) |
| *B62D 21/08* | (2006.01) |
| *B62D 21/16* | (2006.01) |
| *B62D 21/09* | (2006.01) |

(52) U.S. Cl.
CPC .......... *B60K 15/067* (2013.01); *B60K 15/073* (2013.01); *B62D 21/155* (2013.01); *B62D 21/08* (2013.01); *B62D 21/09* (2013.01); *B62D 21/16* (2013.01)

(58) Field of Classification Search
CPC .. B60K 15/067; B60K 15/073; B62D 21/155; B62D 21/08; B62D 21/09; B62D 21/16; F16B 1/26
See application file for complete search history.

(56) References Cited

U.S. PATENT DOCUMENTS

| | | | |
|---|---|---|---|
| 5,366,246 A * | 11/1994 | Chen ...................... | B60K 15/03 280/834 |
| 5,380,042 A * | 1/1995 | Hively .................. | B62D 21/16 224/538 |
| 9,440,527 B1 | 9/2016 | Maeda | |
| 2009/0058140 A1 | 3/2009 | Chuang-Hsiung | |
| 2009/0206588 A1* | 8/2009 | Shaw ...................... | B62J 27/00 280/755 |
| 2010/0301084 A1* | 12/2010 | Johnson .................. | B60R 11/06 224/555 |
| 2015/0210319 A1 | 7/2015 | Tiramani | |
| 2021/0008977 A1* | 1/2021 | Reedy .................. | B60K 15/067 |

(Continued)

FOREIGN PATENT DOCUMENTS

| | | | | |
|---|---|---|---|---|
| CA | 2809250 A1 * | 5/2013 | ............ | B60K 15/07 |
| CN | 201922923 U * | 8/2011 | | |
| CN | 204210305 | 3/2015 | | |

(Continued)

*Primary Examiner* — James A English
*Assistant Examiner* — Scott F. Underwood

(57) ABSTRACT

A mounting system for mounting a tank to a space frame comprises a side mount configured to mount the tank to a center upper frame connection of the space frame, and a bottom mount configured to mount the tank to an elongate support member of the space frame. The bottom mount and the side mount are distinct mounts and configured to be mounted to the tank in a spaced apart relationship with respect to each other. The bottom mount and the side mount are coupled to a bottom and a rear side of the tank, respectively, and together are configured to mount the tank to the space frame.

18 Claims, 6 Drawing Sheets

(56) References Cited

U.S. PATENT DOCUMENTS

2021/0300177 A1* 9/2021 Yagi .................... B60K 15/067

FOREIGN PATENT DOCUMENTS

| | | | |
|---|---|---|---|
| CN | 204488938 U | 7/2015 | |
| CN | 103192881 B | 8/2015 | |
| CN | 204688212 U | 10/2015 | |
| CN | 108349544 A | 7/2018 | |
| CN | 109204476 A | 1/2019 | |
| DE | 202007017140 U1 | 4/2009 | |
| DE | 102010024764 A1 * | 2/2011 | ............. B62D 21/02 |
| DE | 102013002579 A1 * | 8/2014 | ............. B60K 13/04 |
| EP | 0872372 A1 * | 10/1998 | |
| EP | 2133259 | 12/2009 | |
| JP | 2012121438 | 6/2012 | |
| KR | 10-20120084761 | 7/2012 | |
| KR | 20160021527 A * | 2/2016 | |
| WO | WO-2011058974 A1 * | 5/2011 | ........... A01C 11/003 |

\* cited by examiner

HAUL TRUCK SPACE FRAME MOUNTING ARRANGEMENT

TECHNICAL FIELD

The present disclosure relates to haul trucks, and more particularly to space frame mounting arrangements for tanks of haul trucks, and systems, components, and methods thereof.

BACKGROUND

Conventional vehicles can have chassis comprised of a plurality of elongated tubular members. Such chassis can be provided according to a number of configurations, each of which typically involves the challenge of coupling various vehicle components relative to the particular chassis configuration.

U. S. Patent App. Pub. 2015/0210319 ("the '319 publication") describes a vehicle system that includes a vehicle chassis with a plurality of elongated tubular members. According to the '319 publication, the tubular members can be modular or fixed within the vehicle chassis to provide support and/or mounting locations for other vehicle components. For example, the '319 publication describes a cantilevered portion of the vehicle chassis that operates as a "floating" center console and is configured to include various interior controls. The '319 publication also describes a removable bracket that can be removably coupled to the vehicle chassis using various fasteners.

SUMMARY OF THE DISCLOSURE

In one aspect, a mounting system for mounting a hydraulic tank to a space frame is disclosed. The mounting system can comprise a side mount configured to mount the hydraulic tank to a center upper frame connection of the space frame; and a bottom mount configured to mount the hydraulic tank to a horizontally extending elongate support member of the space frame. The bottom mount and the side mount are distinct mounts and configured to be mounted to the hydraulic tank in a spaced apart relationship with respect to each other, and the bottom mount and the side mount are coupled to a bottom and a rear side of the hydraulic tank, respectively, and together are configured to mount the hydraulic tank to the space frame.

In another aspect, a mounting arrangement for a haul truck having a space frame is disclosed. The mounting arrangement can be comprised of a center upper frame connection on one side of the space frame; an elongate support member on the one side of the space frame; a tank coupled to the one side of the space frame; and a mounting system configured to mount the tank to the one side of the space frame. The mounting system can include a bottom mount configured to mount the tank to the elongate support member, and a side mount configured to mount the tank to the center upper frame connection. The bottom mount is mounted on the elongate support member, and the side mount is mounted on an outer lateral surface of a center boss of the center upper frame connection.

And in yet another aspect, an off-highway rear haul truck is disclosed. The off-highway rear haul truck can be comprised of a space frame, a hydraulic tank coupled to one side of the space frame, and a mounting system configured to mount the hydraulic tank to said one side of the space frame. The space frame can include a pair of center upper frame connections, the center upper frame connections being spaced from each other in a width direction of the space frame, a pair of center lower frame connections, the center lower frame connections being spaced from each other in the width direction of the space frame, and a plurality of frame tubes coupled to the center upper frame connections and the center lower frame connections, the plurality of frame tubes including first sets of frame tubes coupled to the center upper frame connections and second sets of frame tubes coupled to the center lower frame connections. The mounting system can include a bottom mount configured to support a bottom of the hydraulic tank, and a side mount configured to support a side of the hydraulic tank. The bottom mount of the mounting system is mounted on one of the frame tubes of the second set of frame tubes, the side mount is mounted to one of the center upper frame connections via an isolation mount, the bottom of the hydraulic tank is mounted on the bottom mount, and the side of the hydraulic tank is mounted to the side mount.

Other features and aspects of this disclosure will be apparent from the following description and the accompanying drawings.

DETAILED DESCRIPTION

Figure 1:
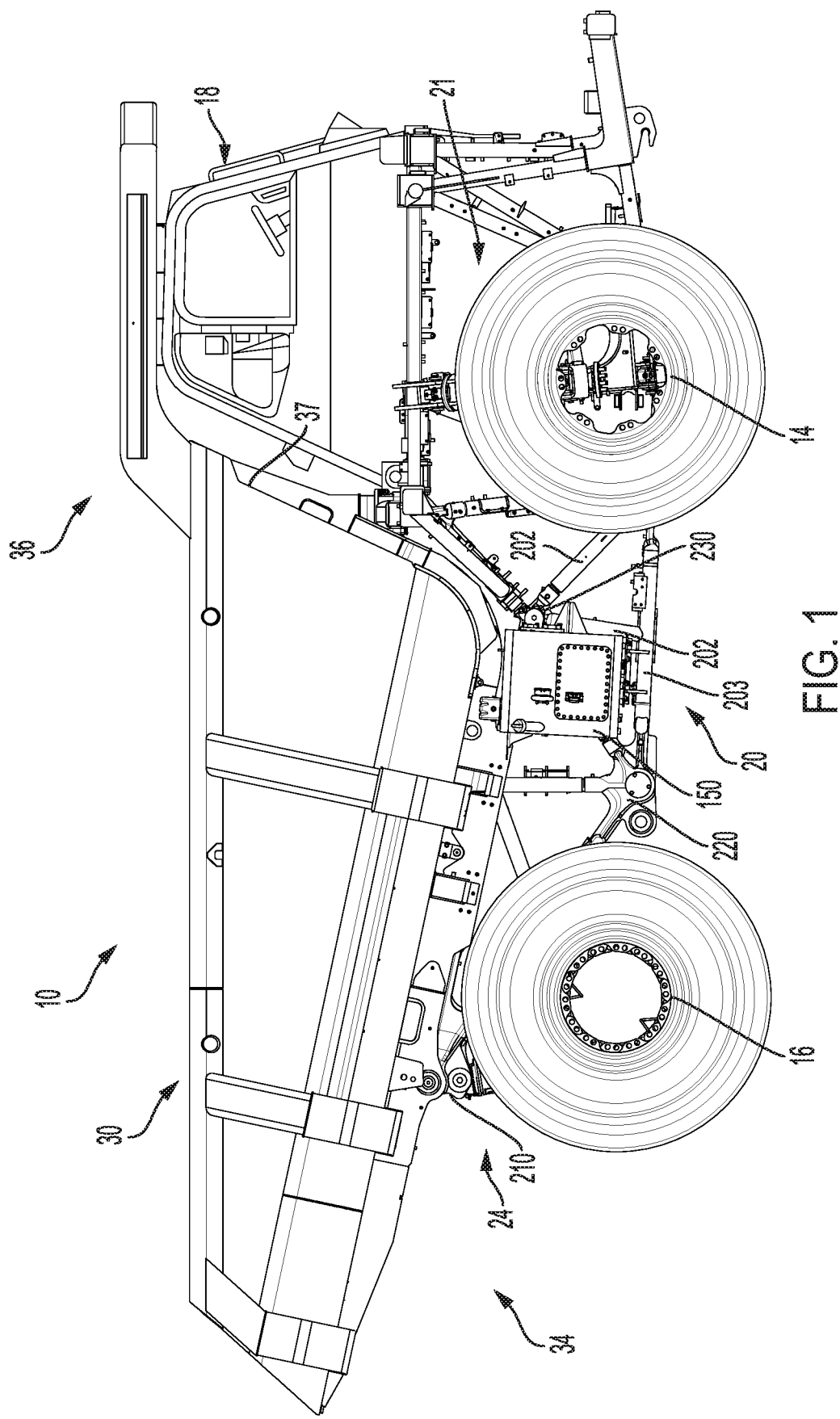
FIG. 1 is a side view of a machine according to embodiments of the disclosed subject matter.

Referring now to the drawings and with specific reference to FIG. 1, this figure illustrates an exemplary embodiment of a machine 10. Machine 10 may be a mobile machine that performs some type of operation associated with an industry such as mining, construction, or any other industry known in the art. For example, as shown in FIG. 1, machine 10 may be an earth moving machine, particularly, an off-highway rear haul truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. As shown in FIG. 1, a tank 150, which may be a hydraulic tank configured to store and/or process hydraulic fluid for the machine 10, can be provided at one side of the machine 10. Discussed in more detail below, the tank 150 can be coupled to the space frame 20.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised), whether the machine 10 is moving or not. The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Exhaust from the prime mover may be output from one or more exhaust outputs (not expressly shown). Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 2:
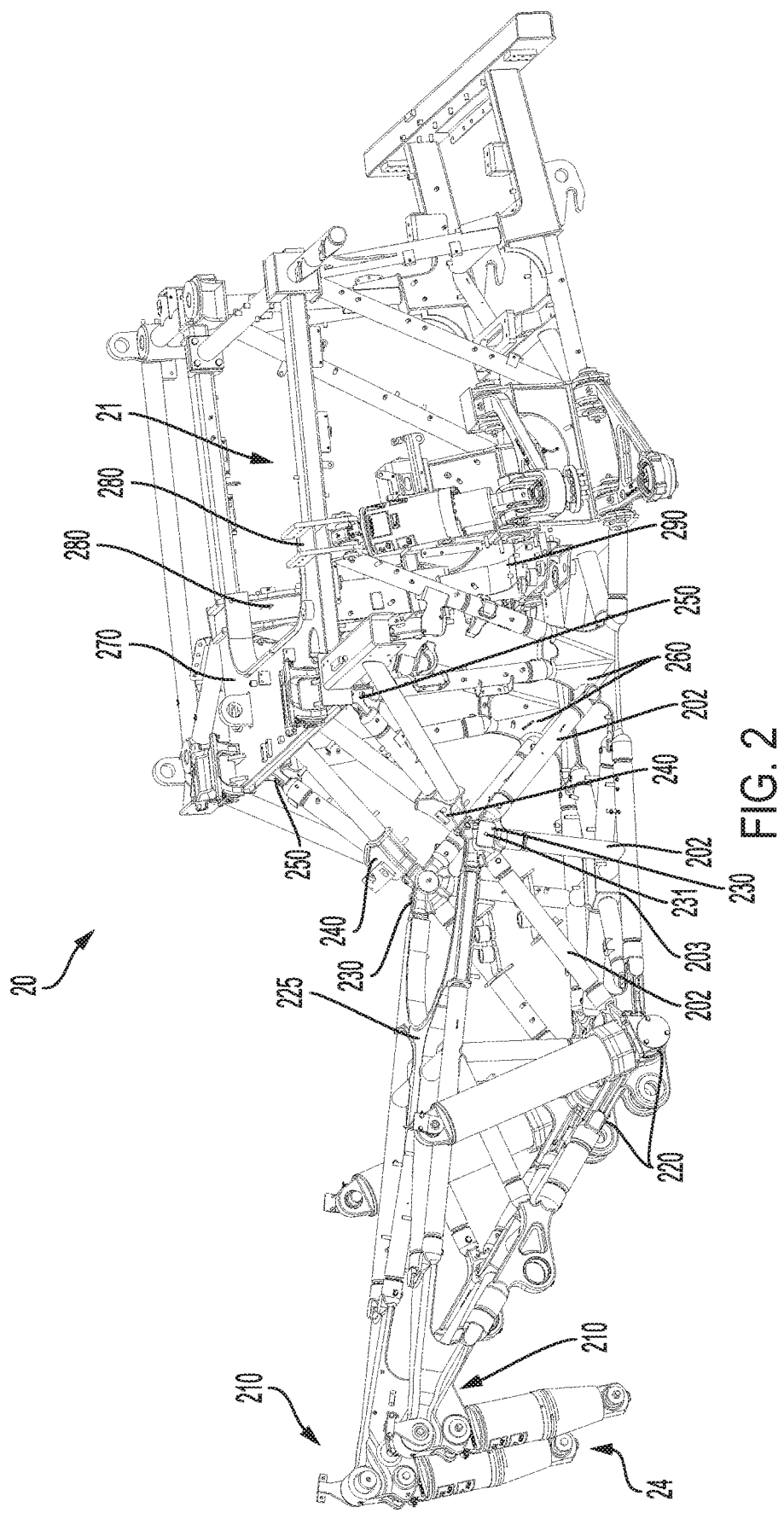
FIG. 2 is a side view of a space frame according to embodiments of the disclosed subject matter.

FIG. 2 is a more detailed view of the space frame 20. As shown, the space frame 20 can include a pair of rear frame connections 210 at the rear 24 of the space frame 20, a pair of center lower frame connections 220, a center upper horizontal frame connection 225, a pair of center upper frame connections 230, a pair of center upper frame nodal connections 240, a pair of front upper frame connections 250, a pair of front lower frame connections 260, a front upper frame connection 270, a pair of front upper suspension connections 280, and a front lower suspension connection 290. The foregoing connections can be castings or fabrications. In general, a casting may refer to a connection that is not welded to another support component of the space frame 20, and a fabrication may refer to a connection that is welded to another support component of the space frame 20.

The rear frame connections 210 and corresponding connections can be as set forth in U.S. application Ser. No. 16/663,815 filed Oct. 25, 2019 (Case 19-0764); the center lower frame connections 220 and corresponding connections can be as set forth in U.S. application Ser. No. 16/663,892 filed Oct. 25, 2019 (Case 19-0767); the center upper horizontal frame connection 225 and corresponding connections can be as set forth in U.S. application Ser. No. 16/663,930 filed Oct. 25, 2019 (Case 19-0768); the center upper frame nodal connections 240 and corresponding connections can be as set forth in U.S. application Ser. No. 16/663,955 filed Oct. 25, 2019 (Case 19-0771); the front upper frame connections 250 and corresponding connections can be as set forth in U.S. application Ser. No. 16/664,010 filed Oct. 25, 2019 (Case 19-0772); the front lower frame connections 260 and corresponding connections can be as set forth in U.S. application Ser. No. 16/664,104 filed Oct. 25, 2019 (Case 19-0762); the front upper frame connection 270 and corresponding connections can be as set forth in U.S. application Ser. No. 16/663,849 filed Oct. 25, 2019 (Case 19-0766); the front upper suspension connections 280 and corresponding connections can be as set forth in U.S. application Ser. No. 16/664,124 filed Oct. 25, 2019 (Case 19-0759); and/or the front lower suspension connection 290 and corresponding connections can be as set forth in U.S. application Ser. No. 16/664,169 filed Oct. 25, 2019 (Case 19-0760). The foregoing applications are incorporated herein by reference in their entireties.

The space frame 20 can also include a plurality of elongate support members, such as elongate support members 202 and elongate members 203. Elongate support members, according to embodiments of the disclosed subject matter, can be in the form of rods and/or tubes, circular, for instance, where some or all of the rods and/or tubes may be solid or hollow.

As shown in FIG. 2, the elongate support members 202 can be coupled to the center lower frame connection 220 and/or the center upper frame connection 230. According to one or more embodiments, for each center lower frame connection 220 and center upper frame connection 230 set per side of the space frame 20, at least one elongate support member 202 can be common between the two connections. That is, at least one elongate support member 202 can be coupled to the center lower frame connection 220 and the center upper frame connection 230.

The elongate support member 203 can be coupled at one end to the center lower frame connection 220 and at another end to the front lower frame connection 260. Additionally, one of the elongate support members 202 can extend vertically (including generally vertical, e.g., 5° or less from vertical) from the center upper frame connection 230 to the elongate support member 203. As shown in FIGS. 1 and 2, for instance, the elongate support member 203 can extend horizontally (including generally horizontal, e.g., 5° or less from horizontal) between the center lower frame connection 220 and the front lower frame connection 260. Also shown in FIG. 1, the elongate support member 203 can be below the tank 150 in a side view of the machine 10.

Each center upper frame connection 230, which can be a casting, can have coupled thereto a plurality of the elongate support members 202, such as described above and as shown in FIG. 2. The center upper frame connection 230 can also be coupled to the center upper horizontal frame connection 225 and the center upper frame nodal connection 240. According to one or more embodiments, the center upper frame connections 230 and corresponding connections can be as set forth in U.S. application Ser. No. 16/664,042 filed Oct. 25, 2019 (Case 19-0773), which is incorporated herein by reference in its entirety.

Turning to FIGS. 3-8, the tank 150 can be coupled to the space frame 20 via a mounting arrangement. More specifically, a mounting system that can be comprised of a side mount 160 and a bottom mount 170 can mount the tank 150 to the space frame 20. Optionally, the side mount 160 and the bottom mount 170 can be the only means by which the tank 150 is mounted or coupled to the space frame 20. Thus, in one or more embodiments, the mounting system can consist of the bottom mount 170 and the side mount 160.

Figure 5:
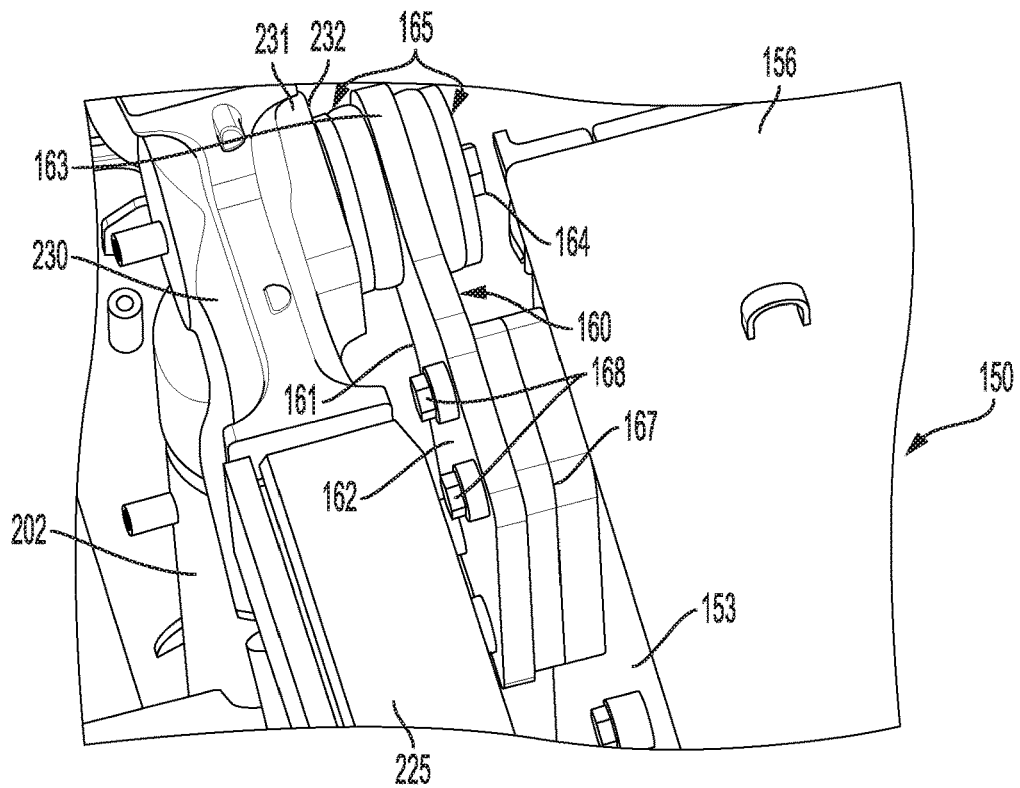
FIG. 5 is a top view of the mounting arrangement of FIG. 3.

The tank can have a front 152, a rear 153, a first side 154, a second side 155, a top 156, and a bottom 157, each of which may be defined by a corresponding wall and optionally other features, including connections, openings, fasteners, etc., such as those shown in the figures. Generally, the side mount 160 can support the rear side 153 of the tank 150, and the bottom mount 170 can support the bottom 157 of the tank 150 when the tank 150 is mounted to the space frame 20. Moreover, the side mount 160 and the bottom mount 170 can be distinct mounts provided in spaced relationship with respect to each other, meaning that no part of the side mount 160 touches any part of the bottom mount 170. In any event, the side mount 160 and the bottom mount 170 can, together, support the tank 150 on the space frame 20. Additionally, when mounted, the tank 150 can be positioned laterally outward of the center upper frame connection 230, such as shown in FIG. 5.

Figure 3:
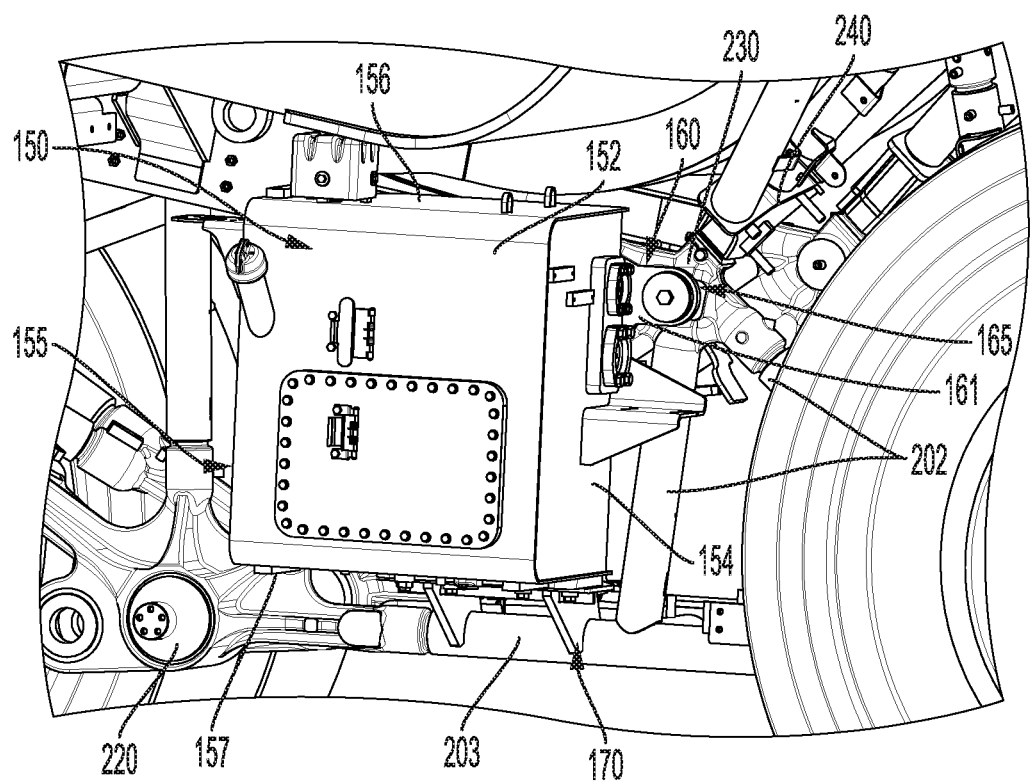
FIG. 3 is an enlarged view of the machine of FIG. 1 showing a mounting arrangement for a hydraulic tank according to embodiments of the disclosed subject matter.

According to one or more embodiments of the disclosed subject matter, the side mount 160 can mount the tank 150 to the center upper frame connection 230, and the bottom mount 170 can mount the tank 150 to the elongate support member 203, such as shown in FIG. 3. That is, the side mount 160 can be mounted to the center upper frame connection 230 and to the rear side 153 of tank 150 when the tank 150 is mounted to the space frame 20. Likewise, the bottom mount 170 can be mounted on the elongate support member 203 and to the bottom 157 of the tank 150 when the tank 150 is mounted to the space frame 20. As shown in FIGS. 1 and 3, for instance, the elongate support member 203 can extend below the bottom mount 170 and the tank 150 in a side view of the machine 10.

The side mount 160 can be fixedly coupled to each of the rear side 153 of the tank 150 and an outer lateral surface of the center upper frame connection 230. In this context, fixedly coupled can mean that the coupling is fixed, for instance, via fasteners (including an isolation mount), but not necessarily permanent. Thus, the coupling can be undone by removing corresponding fasteners of the couplings, for instance, to remove one or more components of the machine 10, including removal of the tank 150 itself. According to one or more embodiments of the disclosed subject matter, the coupling to the outer lateral surface of the center upper frame connection 230 may be considered as an "ISO" mounting, which can allow flexing at the coupling to some extent.

Figure 4:
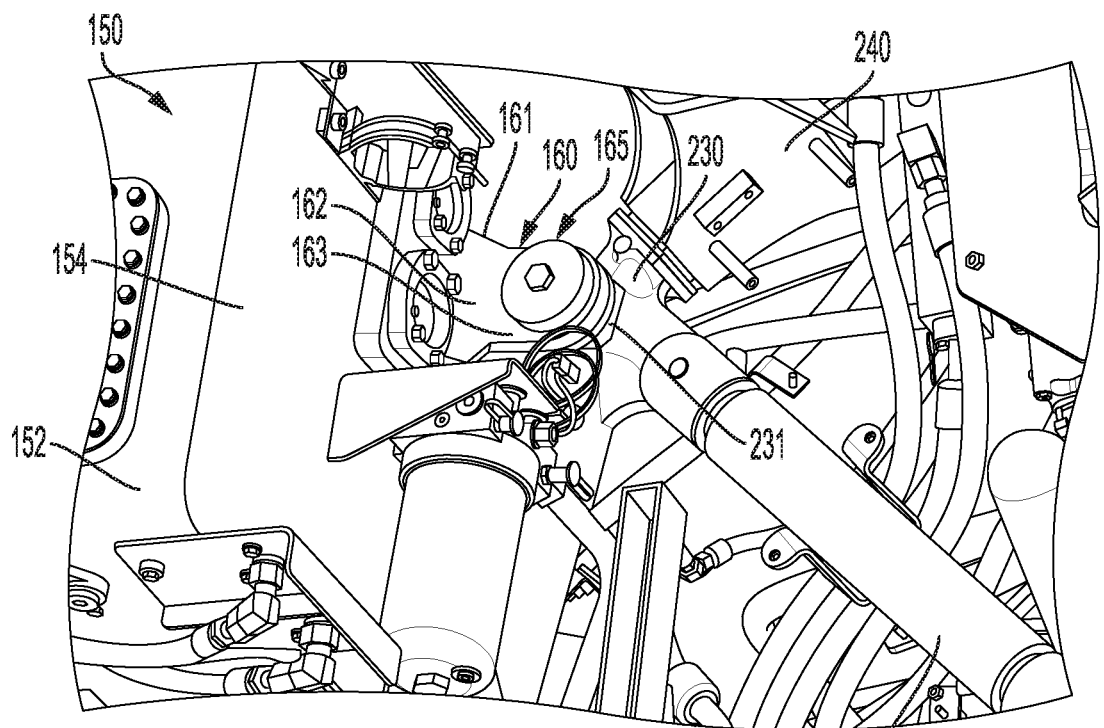
FIG. 4 shows a side view of the mounting arrangement of FIG. 3.

As shown in FIGS. 3-8, the side mount 160 can include a plate 161. The plate 161 can include a base 162 and a neck 163, where the base 162 can be fixedly coupled to the rear side 153 of the tank 150 and the neck 163 can be fixedly coupled to the center upper frame connection 230. As shown in FIGS. 3 and 4, the neck 163 can extend or stick out from the first side 154 of the tank 150 in a front view of the tank 150.

Figure 7:
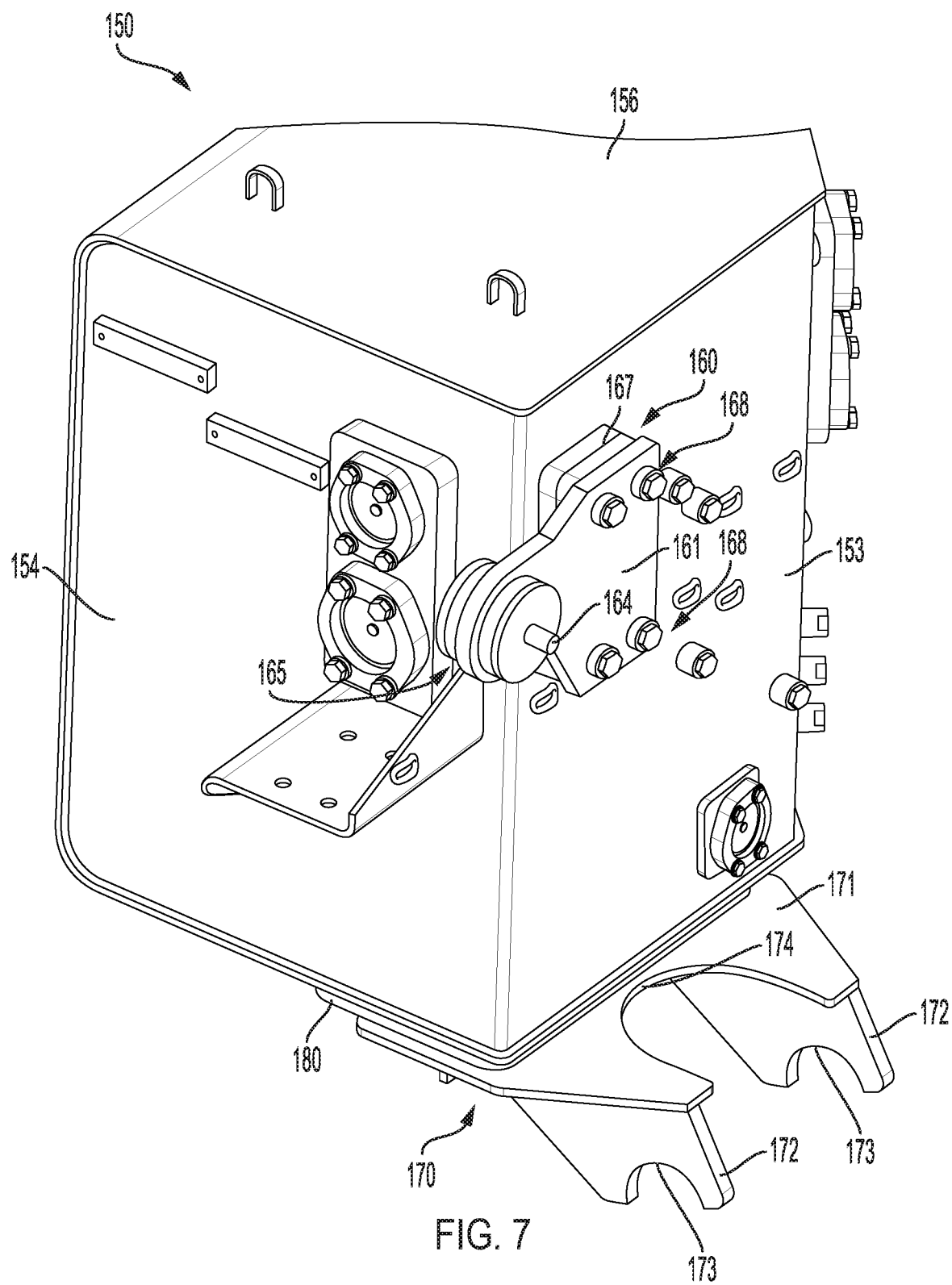
FIGS. 7 and 8 are perspective views of the mounting arrangement of FIG. 3 without the components of the space frame.
Figure 8:
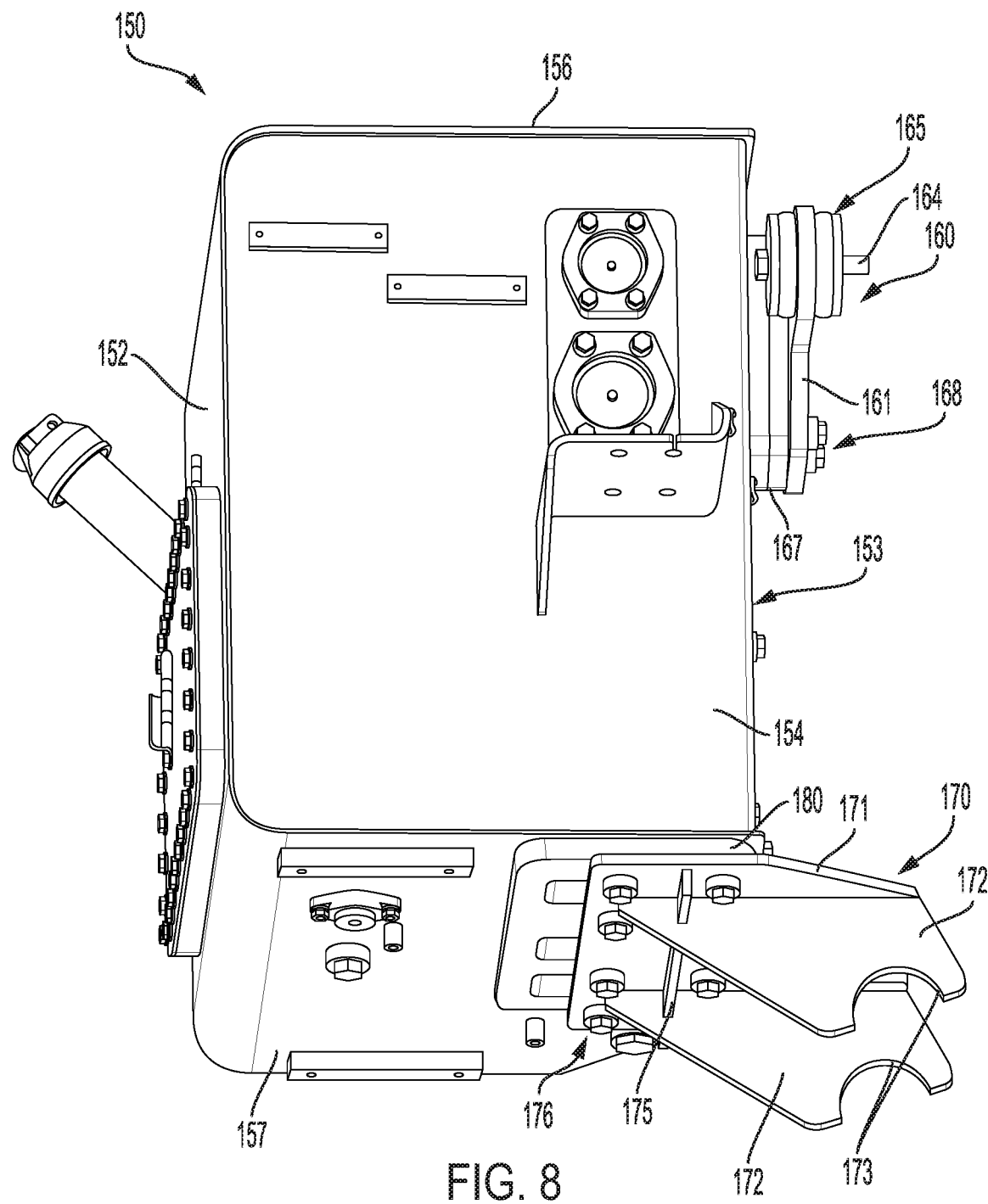

The base 162 of the plate 161 can be coupled to the rear side 153 of the tank 150 using one or more fasteners 168. As a non-limiting example, FIGS. 5, 7, and 8 show that the one or more fasteners 168 can be one or more bolts that extend through the base 162 and into the rear side 153 of the tank 150. Optionally, one or more spacers 167 can be provided between the base 162 and the rear side 153 of the tank 150. FIG. 5, for instance, shows two spacers 167. The one or more spacers 167 can space the neck 163 of the plate 161 laterally inward relative to the rear side 153 of the tank 150. Such spacing can provide clearance associated with the connection of the neck 163 to the center upper frame connection 230. The one or more spacers 167 may also be semi-rigid, for instance, an elastomeric member (or members), which may provide for a limited amount of movement or flexing for the coupling. Such flexing may be to accommodate for stresses caused by movement of the machine 10, for instance.

The neck 163 of the plate 161 can be coupled to an outer lateral surface 232 of the center upper frame connection 230. The outer lateral surface 232, according to embodiments of the disclosed subject matter, can be an outer lateral surface of a center boss 231 of the center upper frame connection 230. According to one or more embodiments, the neck 163 can be coupled to the center upper frame connection 230 via an isolation mount 165, as a non-limiting example (e.g., an isomount). A portion of the isolation mount 165 can be on one side of the neck 163, and another portion of the isolation mount 165 can be on the other side of the neck 163, such as shown in FIGS. 5 and 7. A fastener 164, for instance, a bolt, can be part of the isolation mount 165, and may be coupled through the isolation mount 165 and the neck 163 to the center upper frame connection 230.

Generally, the isolation mount 165 can have relatively rigid portions and relatively pliable or flexible portions, for instance, elastomer portions. Optionally, the flexible portions can be provided against the neck 163. The isolation mount 165 can ensure a secure yet somewhat dynamic connection between the neck 163 and the center upper frame connection 230 to provide effective shock absorption and vibration isolation and damping.

As noted above, the bottom mount 170 can be mounted on the elongate support member 203 when the tank 150 is mounted to the space frame 20. According to one or more embodiments of the disclosed subject matter, the bottom mount 170 can be fixedly coupled to the elongate support member 203. For example, the bottom mount 170 can be welded to the elongate support member 203.

Figure 6:
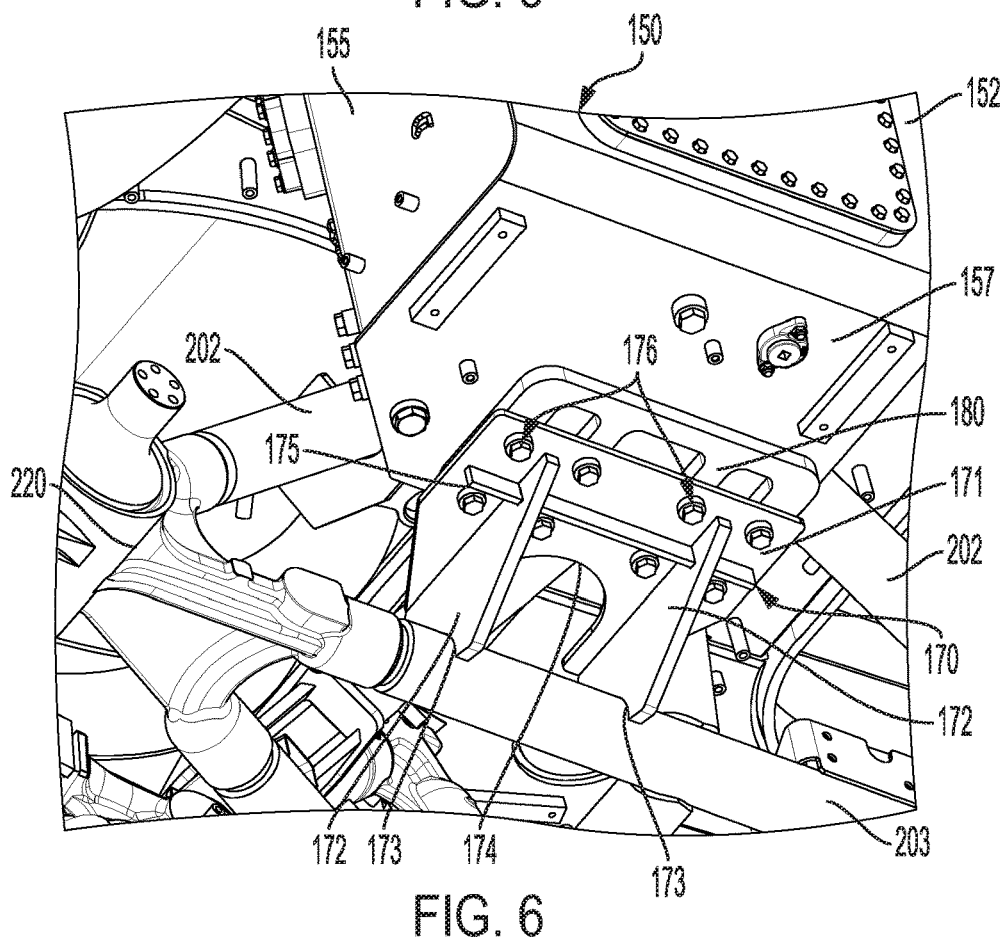
FIG. 6 is a bottom view of the mounting arrangement of FIG. 3.

The bottom mount 170 can also be mounted to the bottom 157 of the tank 150 when the tank 150 is mounted to the space frame 20 using one or more fasteners 176. As a non-limiting example, FIGS. 6 and 8 show that the one or more fasteners 176 can be one or more bolts that extend through the bottom mount 170 and into the bottom 157 of the tank 150.

The bottom mount 170 can include a base 171 and legs 172. The legs 172, which can be spaced from each other, can extend from a bottom of the base 171, for instance, downward and laterally outward. The legs 172 each can include a cut-out 173. The cut-outs 173 can be configured to engage or as a receptacle for the elongate support member 203. For instance, the cut-outs 173 can be sized and shaped based on the size and shape of the elongate support member 203. That is, the cut-outs 173 can be sized and shaped to contour or wrap around a portion of the elongate support member 203. The cut-outs 173 can also be fixedly coupled to the elongate support member 203, for instance, via welding.

The base 171 can also include a cut-out 174, which may be configured to accommodate another component of the machine 10 (including another component of the space frame 20). Optionally, a support structure 175 can be provided on the bottom of the base 171. As shown, the support structure 175 can extend through both of the legs 172.

Optionally, a spacer 180 may be provided between a top side of the base 171 and the bottom 157 of the tank 150. According to one or more embodiments, the spacer 180 can be considered part of the bottom support 170. Thus, the fasteners 176 can extend through the base 171 and optionally the spacer 180 to couple the bottom mount 170 to the tank 150.

INDUSTRIAL APPLICABILITY

As noted above, embodiments of the present disclosure relate to space frame mounting arrangements for tanks of haul trucks, and systems, components, and methods thereof. Embodiments of the disclosed subject matter can provide an effective and efficient means by which to mount (and unmount) a tank, such as the tank 150 (which may be a hydraulic tank), to a space frame, such as the space frame 20.

Embodiment of the disclosed subject matter can implement a multi-component mounting configuration whereby different mounts can be provided to provide non-symmetrical support for different portions of the tank 150, particularly the bottom 157 of the tank 150 and the rear side 153 of the tank 150.

Generally, the side mount 160 can support the rear side 153 of the tank 150, and the bottom mount 170 can support the bottom 157 of the tank 150 when the tank 150 is mounted to the space frame 20. Moreover, the side mount 160 and the bottom mount 170 can be distinct mounts provided in spaced relationship with respect to each other, meaning, for instance, that no part of the side mount 160 touches any part of the bottom mount 170.

The side mount 160 can be provided to couple the rear side 153 of the tank 150 to the space frame 20, particularly the center upper frame connection 230 of the space frame 20. The side mount 160 can include plate 161, which can include a base 162 and a neck 163, where the base 162 can be fixedly coupled to the rear side 153 of the tank 150 and the neck 163 can be fixedly coupled to the center upper frame connection 230. The coupling of the neck 163 to the outer lateral surface 232 of the center upper frame connection 230 may be considered as an isolation or "ISO" mounting. Thus, according to embodiments of the disclosed subject matter, the isolation mount 165 can couple the neck 163 to the center upper frame connection 230. The coupling of the side mount 160 to the tank 150 and the space frame 20 can be such that the tank 150 can be allowed a limited amount of movement relative to the center upper frame connection 230. Such coupling using the isolation mount 165, for instance, can provide effective shock absorption and vibration isolation and damping.

The bottom mount 170 can be provided to couple the bottom 157 of the tank 150 to the space frame 20, particularly the elongate support member 203. The bottom mount 170 can include a base 171 with one or more legs 172. The bottom mount 170, particularly the one or more legs 172 thereof, can be configured to be fixedly coupled to the elongate support member 203. According to one or more embodiments, the legs 172 can be welded to the elongate support member 203. The bottom mount 170 can also be fixedly coupled to the bottom 157 of the tank 150, either directly or indirectly.

The side mount 160 and the bottom mount 170, together, can reliably support the tank 150 on the space frame 20 to prevent or minimize damage to the space frame 20 from dynamic forces or stresses as they pertain to the tank 150 mounted on the space frame 20, particularly when the machine 10 is moving.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An off-highway rear haul truck comprising:
   a space frame including:
      a pair of center upper frame connections, the center upper frame connections being spaced from each other in a width direction of the space frame,
      a pair of center lower frame connections, the center lower frame connections being spaced from each other in the width direction of the space frame, and
      a plurality of frame tubes coupled to the center upper frame connections and the center lower frame connections, the plurality of frame tubes including first sets of frame tubes coupled to the center upper frame connections and second sets of frame tubes coupled to the center lower frame connections;
   a hydraulic tank coupled to one side of the space frame; and
   a mounting system configured to mount the hydraulic tank to said one side of the space frame, the mounting system including:
      a bottom mount configured to support a bottom of the hydraulic tank, and
      a side mount configured to support a side of the hydraulic tank,
   wherein the bottom mount of the mounting system is mounted on one of the frame tubes of the second set of frame tubes,
   wherein the side mount is mounted to one of the center upper frame connections via an isolation mount, and
   wherein the bottom of the hydraulic tank is mounted on the bottom mount, and the side of the hydraulic tank is mounted to the side mount.

2. The off-highway rear haul truck of claim 1, wherein said one frame tube on which the bottom mount is mounted extends horizontally below the bottom mount and the hydraulic tank.

3. The off-highway rear haul truck of claim 1, wherein one of the frame tubes is common between the first and second sets of frame tubes.

4. The off-highway rear haul truck of claim 1, wherein the hydraulic tank is laterally outward of the center upper frame connection on said one side of the space frame to which the hydraulic tank is coupled.

5. The off-highway rear haul truck of claim 1, wherein the bottom mount is welded to said one of the frame tubes when the hydraulic tank is mounted to said one side of the space frame.

6. The off-highway rear haul truck of claim 1, wherein the side mount is fixedly coupled to an outer lateral surface of said one of the center upper frame connections via the isolation mount when the hydraulic tank is mounted to said one side of the space frame.

7. The off-highway rear haul truck of claim 1, wherein the mounting system to mount the hydraulic tank to said one side of the space frame consists of the bottom mount and the side mount.

8. A mounting arrangement for a haul truck having a space frame comprising:
  a center upper frame connection on one side of the space frame;
  an elongate support member on the one side of the space frame;
  a tank coupled to the one side of the space frame; and
  a mounting system configured to mount the tank to the one side of the space frame, the mounting system including:
    a bottom mount configured to mount the tank to the elongate support member, and
    a side mount configured to mount the tank to the center upper frame connection,
  wherein the bottom mount is mounted on the elongate support member,
  wherein the side mount is mounted on an outer lateral surface of a center boss of the center upper frame connection, and wherein the bottom mount is welded to the elongate support member and is fixedly coupled to a bottom of the tank.

9. The mounting arrangement of claim 8, wherein the side mount is fixedly coupled to the outer lateral surface of the center boss of the center upper frame connection and fixedly coupled to a rear side of the tank.

10. The mounting arrangement of claim 9, wherein the side mount includes a plate having a base and a neck, the base being fixedly coupled to the rear side of the tank, and the neck being fixedly coupled to the outer lateral surface of the center boss of the center upper frame connection.

11. The mounting arrangement of claim 10, wherein the neck extends from a side of the tank in a front view of the tank.

12. The mounting arrangement of claim 10, wherein the side mount further includes an isolation mount coupling the neck to the outer lateral surface of the center boss of the center upper frame connection.

13. The mounting arrangement of claim 10, wherein the side mount further includes at least one spacer between the base and the rear side of the tank.

14. The mounting arrangement of claim 8, wherein the mounting system to mount the tank to the one side of the space frame consists of the bottom mount and the side mount.

15. A mounting system for mounting a hydraulic tank to a space frame comprising:
  a side mount configured to mount the hydraulic tank to a center upper frame connection of the space frame; and
  a bottom mount configured to mount the hydraulic tank to a horizontally extending elongate support member of the space frame,
  wherein the bottom mount and the side mount are distinct mounts and configured to be mounted to the hydraulic tank in a spaced apart relationship with respect to each other,
  wherein the bottom mount and the side mount are coupled to a bottom and a rear side of the hydraulic tank, respectively, and together are configured to mount the hydraulic tank to the space frame,
  wherein the bottom mount is configured to be welded on an upper surface of the horizontally extending elongate support member and support a bottom of the hydraulic tank, and
  wherein the side mount is configured to be fixed to an outer lateral surface of the center upper frame connection and support a rear side of the hydraulic tank.

16. The mounting system of claim 15, wherein the side mount includes a plate having a base and a neck, the base being fixedly coupled to the rear side of the hydraulic tank, and the neck being fixedly coupled to the outer lateral surface of the center upper frame connection.

17. The mounting system of claim 16, further comprising an isolation mount fixedly coupling the neck of the plate to the outer lateral surface of the center upper frame connection.

18. The mounting system of claim 17, wherein the isolation mount includes an elastomeric member configured to allow flexing of the coupling.

\* \* \* \* \*